United States Patent [19]

Haupt et al.

[11] Patent Number: 5,638,574
[45] Date of Patent: Jun. 17, 1997

[54] CONVERTIBLE LEAF BLOWER AND VACUUM

[75] Inventors: David J. Haupt; Michael S. Houge, both of Shreveport, La.

[73] Assignee: WCI Outdoor Products, Inc., Cleveland, Ohio

[21] Appl. No.: 505,114

[22] Filed: Jul. 21, 1995

[51] Int. Cl.$^6$ ................................................ A47L 5/14
[52] U.S. Cl. ........................... 15/330; 15/344; 15/405
[58] Field of Search ............................. 15/330, 344, 405

[56] References Cited

U.S. PATENT DOCUMENTS

| Re. 33,050 | 9/1989 | Tuggle et al. . | |
|---|---|---|---|
| 1,144,931 | 6/1915 | Boogher . | |
| 1,182,595 | 5/1916 | Stecker . | |
| 1,293,250 | 2/1919 | Trautman . | |
| 1,364,360 | 1/1921 | Emery . | |
| 1,465,097 | 8/1923 | Sherzer . | |
| 1,525,884 | 2/1925 | Plummer . | |
| 1,749,373 | 3/1930 | Breuer . | |
| 2,430,552 | 11/1947 | Bernal . | |
| 2,586,145 | 2/1952 | Breuer et al. . | |
| 3,130,678 | 4/1964 | Chenault . | |
| 3,147,510 | 9/1964 | Thompson . | |
| 3,165,257 | 1/1965 | Edwards . | |
| 3,618,157 | 11/1971 | Bassin .......................... | 15/330 |
| 4,325,163 | 4/1982 | Mattson et al. ................. | 15/405 |
| 4,452,316 | 6/1984 | Edwards . | |
| 4,644,606 | 2/1987 | Luerken et al. ................. | 15/330 |
| 4,674,146 | 6/1987 | Tuggle et al. .................. | 15/330 |
| 4,676,717 | 6/1987 | Willyard, Jr. et al. . | |
| 4,691,423 | 9/1987 | Willyard, Jr. et al. . | |
| 4,694,528 | 9/1987 | Comer et al. .................. | 15/330 |
| 4,756,668 | 7/1988 | Gassen et al. . | |
| 4,799,287 | 1/1989 | Belanger et al. . | |
| 4,880,364 | 11/1989 | Berfield et al. . | |
| 4,884,314 | 12/1989 | Miner et al. . | |
| 4,947,513 | 8/1990 | Everts ........................... | 15/330 |
| 5,003,662 | 4/1991 | Everts . | |
| 5,035,586 | 7/1991 | Sadler et al. . | |

FOREIGN PATENT DOCUMENTS 365173  10/1962  Switzerland .

OTHER PUBLICATIONS

1982 Fan Engineering Robert Jorgenson, Editor; Buffalo Forge Company, Publisher 16 pages.
1983 Operator's Manual, 400 TX Air Rake, 500 TBX Rake–O–Vac The Toro Company 2 pages.
Date unknown Principles of Turbomachinery D. G. Shephard Chapter 6.

Primary Examiner—Tony G. Soohoo
Attorney, Agent, or Firm—Marc A. Hubbard; Winstead Sechrest & Minick P. C.

[57] ABSTRACT

A convertible leaf blower and vacuum apparatus includes a fan and baffle supported on one end of a cylindrical member for insertion into a collar defining an air inlet of the fan for narrowing the diameter of the air inlet when the apparatus is being connected to the collar. A vacuum tube replaces the cylindrical member when the apparatus is in a vacuum. The vacuum tube is connected to the collar in the same manner as the cylindrical member. A cover for overlaying the air inlet is attached on one side to the fan housing by a hinge and the other side by a releasable fastener.

19 Claims, 5 Drawing Sheets

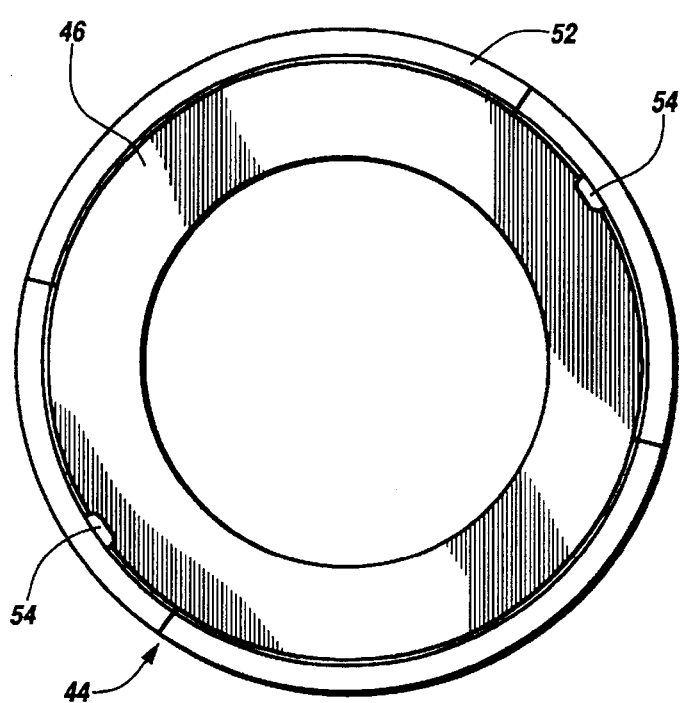
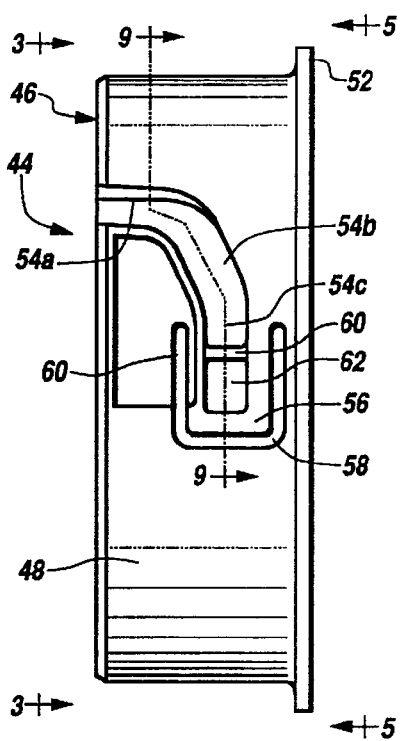
Fig.3      Fig.4
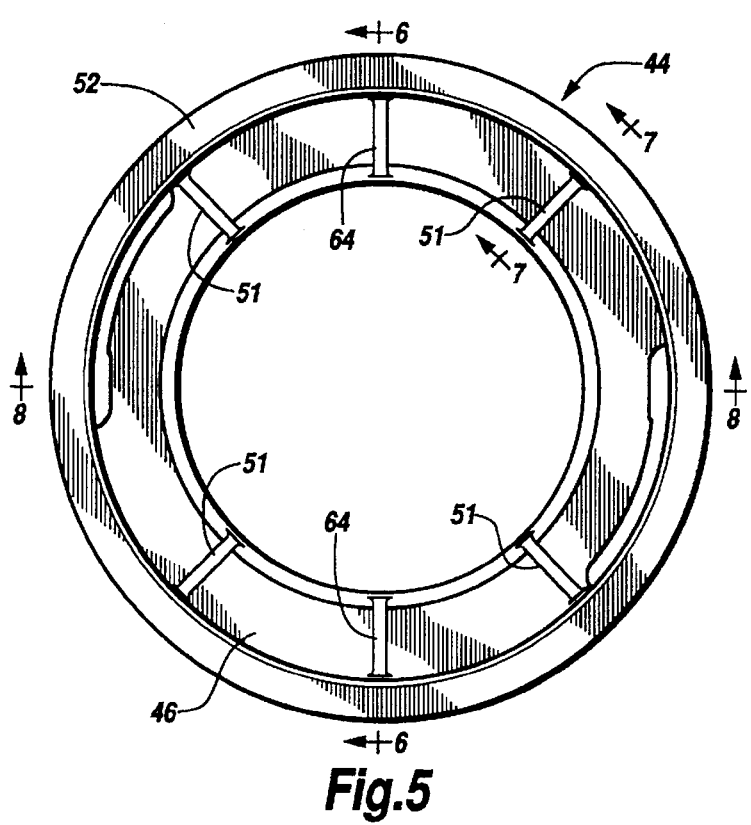
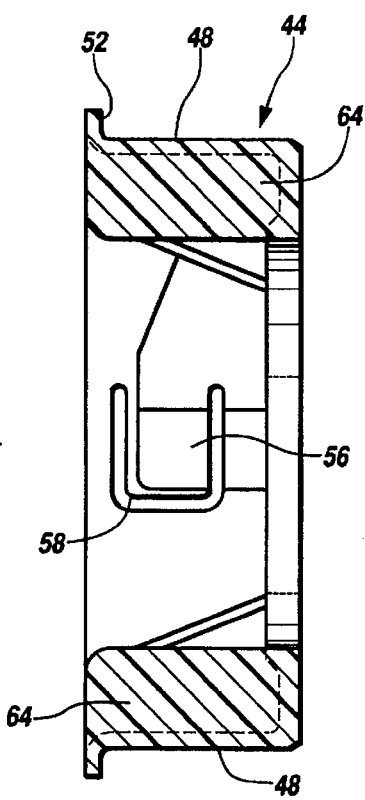
Fig.5      Fig.6

5,638,574

CONVERTIBLE LEAF BLOWER AND VACUUM

FIELD OF THE INVENTION

The invention is directed generally to a portable apparatus for blowing and vacuuming outdoor areas.

BACKGROUND OF THE INVENTION

Portable leaf blower-vacuum devices are well-known and widely used by homeowners and grounds keepers to clean outdoor areas of leaves, grass clippings and debris. A conventional leaf blower-vacuum has a high speed centrifugal fan turned by an output shaft of either an electric motor or an internal combustion engine. The fan includes an impeller enclosed within a housing having an inlet opening and an outlet opening. The motor is mounted to the fan housing and sometimes also enclosed within a separate housing. A handle enables the entire unit to be picked up and held with one hand in an elevated position above the ground.

The fan can be converted for use as either a blower or a vacuum by attaching an elongated tube to either the inlet or the outlet of the fan housing. In a blower mode, the tube concentrates air expelled through the air outlet to create a highly-directed stream of high velocity air at the end of the tube. A cover is placed over the air inlet for preventing accidental ingestion of objects while permitting a free flow of air into the air inlet. In a vacuum mode, the conventional tube is removed from the outlet. A vacuum tube, typically having a larger diameter than the concentrator tube, is attached to the air inlet after the cover is removed. Air drawn through an opening in the end of the vacuum tube tends to entrain objects loose in the vicinity of the end of the tube. The objects are carried by the flow into the fan and then discharged into a porous sack hung around the outlet to collect debris.

Since lawns tend to be relatively large, it is desirable to have a unit which has a large vacuum tube and which draws in large volumes of air. For a given fan turning with a given speed, one way to increase its capacity is to increase the size of its inlet opening. Optimizing the fans capacity by increasing the size of the inlet opening will, however, usually result in a decrease in pressure generated by the fan. A decrease in fan pressure usually means a decrease in the velocity of the air at the fan outlet. However, maximum air velocity is usually desired for the fan when it is being operated as a blower.

In a convertible leaf blower and vacuum apparatus described U.S. Pat. No. 4,694,528 of Comer et al., the diameter of the air inlet is changed by fixing a ring-shaped member to an air inlet cover, thereby automatically narrowing the diameter of the air inlet when the cover is attached over the air inlet. The ring member is disposed close to the impeller and prevents air spill between the high pressure side and low pressure side of the impeller, thus presumably increasing fan pressure and air velocity. Since the ring member must be placed in close proximity to the impeller and fit tightly against the air inlet opening to prevent a flow of air between the ring member and the air inlet, the cover must be carefully aligned with, and stably held against, the air inlet.

One problem with the unit disclosed by Comer et al. is the manner in which the cover is connected to the inlet of the fan housing. Circumscribing the periphery of the cover is a plurality of regularly-spaced locking tabs which interact with a plurality of latching tabs disposed on the outside of the fan housing around the periphery of the air inlet. The same latching tabs are used to connect to the air inlet a vacuum tube, which includes locking tabs like those of the cover. To prevent the tube from wobbling when attached to the air inlet, four latching tabs are used. Aligning all of the locking tabs with the latching tabs can prove difficult, especially when dirt builds up around the opening.

SUMMARY OF THE INVENTION

A leaf blower and vacuum apparatus according to the invention includes a baffle carried by a removable insert for narrowing the diameter of the apparatus' air inlet adjacent an impeller when the apparatus is being operated in blower mode. The insert is connected directly to the inside surface of a cylindrically shaped collar circumscribing an air inlet opening in the fan housing. The invention enables a snug fit and stable connection to the air inlet of the insert carrying the baffle and a rigid vacuum tube with a comparatively simple connection mechanism disposed on the inside of collar. Since there is no baffle which must be made to both depend from the cover and fit close to the impeller and tightly against the air inlet opening, the cover may be attached to the fan housing by a hinge. The cover can thus be conveniently swung to open and close the air inlet. Dust and other debris is less likely to affect attachment and removal of the cover without significant interference from dirt build-up around the cover.

These and other aspects and advantages of the invention will be apparent from the following description of the appended drawings.

BRIEF DESCRIPTION OF THE DRAWINGS

In the appended drawings,

FIG. 3 is a bottom view of the baffle insert;

FIG. 4 is a side view of the baffle insert;

FIG. 5 is a top of the baffle insert;

FIG. 6 is a cross-section of the baffle insert take along section line 6—6 in FIG. 5;

DETAILED DESCRIPTION OF THE DRAWINGS

Figure 1:
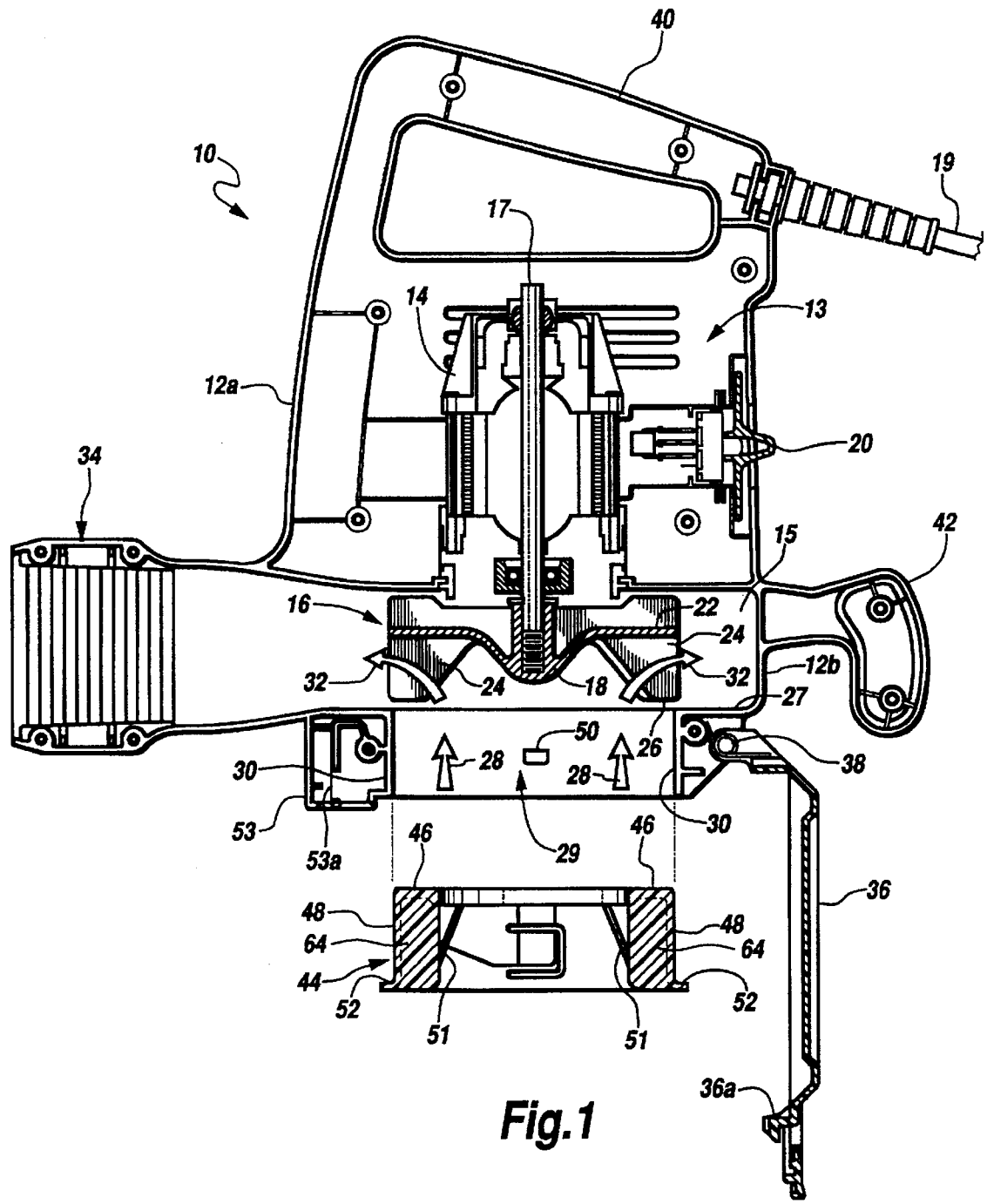
FIG. 1 is a side view of a blower/vacuum unit with one-half of a fan and motor housing removed, with some components sectioned, and showing a baffle insert being installed.

Referring to FIG. 1, left side part of a two-part housing 12 of a fan unit 10 is removed to reveal enclosed components. The housing 12 includes an upper motor housing 12a, which forms a compartment 13 for protecting and a lower fan housing 12b which defines fan chamber 15 in which impeller 16 is received. The motor turns drive shaft 17. Drive shaft 17 is connected to hub 18, which is at the center of impeller 16. The axis of rotation of the impeller is coincident with the axis of rotation of the drive shaft 17. The motor is an electric motor, but an internal combustion engine may be employed instead for turning the impeller. Power is supplied to the motor by cord 19. Switch 20 turns the motor on and off. Internal wiring has been omitted for clarity. The impeller 16 is a centrifugal impeller and is shown sectioned. The impeller is formed of a back plate 22 and a plurality of vanes 24 standing perpendicularly on a front side of the back plate. Each vane has a substantially uniform thickness and lies substantially along a radius extending from the impeller's axis of rotation to its edge. The vanes are situated near the periphery of the impeller. Tips 26 of the vanes extend nearly to a plane in which bottom edge 27 of the fan housing 15 lies.

Rapidly revolving the impeller creates a pressure differential on opposite sides of the vanes. This pressure differential causes an axial flow of air, generally indicated by arrows 28, to enter the fan housing 15 through an inlet opening 29 defined by inlet collar 30. The collar has the shape of a cylinder. The air flow turns as it nears the hub of impeller 16 and then flows in radially, as indicated by arrows 32, into the fan chamber 15. The scroll shape of the fan housing directs the radial flow of air toward an outlet opening defined by outlet collar 34. A cover 36 is connected to the fan housing 12b by hinge 38. The cover includes a plurality of perforations or openings (NOT VIEWABLE) defined through the cover to permit air to flow into the air inlet. The cover swings between an open position, as shown, and a closed position. A spring biases the cover to a closed position. The unit includes a handle 40 connected to the housing 12 for grasping in order to lift the unit while operating it. An auxiliary handle 42 provides an additional location for grasping the unit in order to orient it.

Baffle insert or sleeve 44, formed by cylindrical side wall 48, carries at one end a ring or annulus shaped baffle 46. When the unit is to be used as a blower, the insert is placed within air inlet opening 29 and connected to collar 30. The insert and the collar have approximately the same height. Formed on the outside of side wall 48 of the insert, diametrically opposite each other, are two channels, which are not visible in this view but are illustrated in FIGS. 3–10. During insertion into the collar, these channels each engage a respective one of two lugs 50 (only one is visible) protruding from opposite locations on the inside surface of the collar. The channels and the lugs form a bayonet-style, manually releasable connection between the collar and the insert. Before pushing the insert into the collar, the lugs are first aligned with the channels. As the insert is being pushed into the collar, the lugs follow the channels. The channels are oriented to cause the insert to twist as it is being inserted. Once fully inserted, the insert is then twisted until it is locked. The insert is unlocked by manually twisting it the opposite direction and then removing it.

Figure 2:
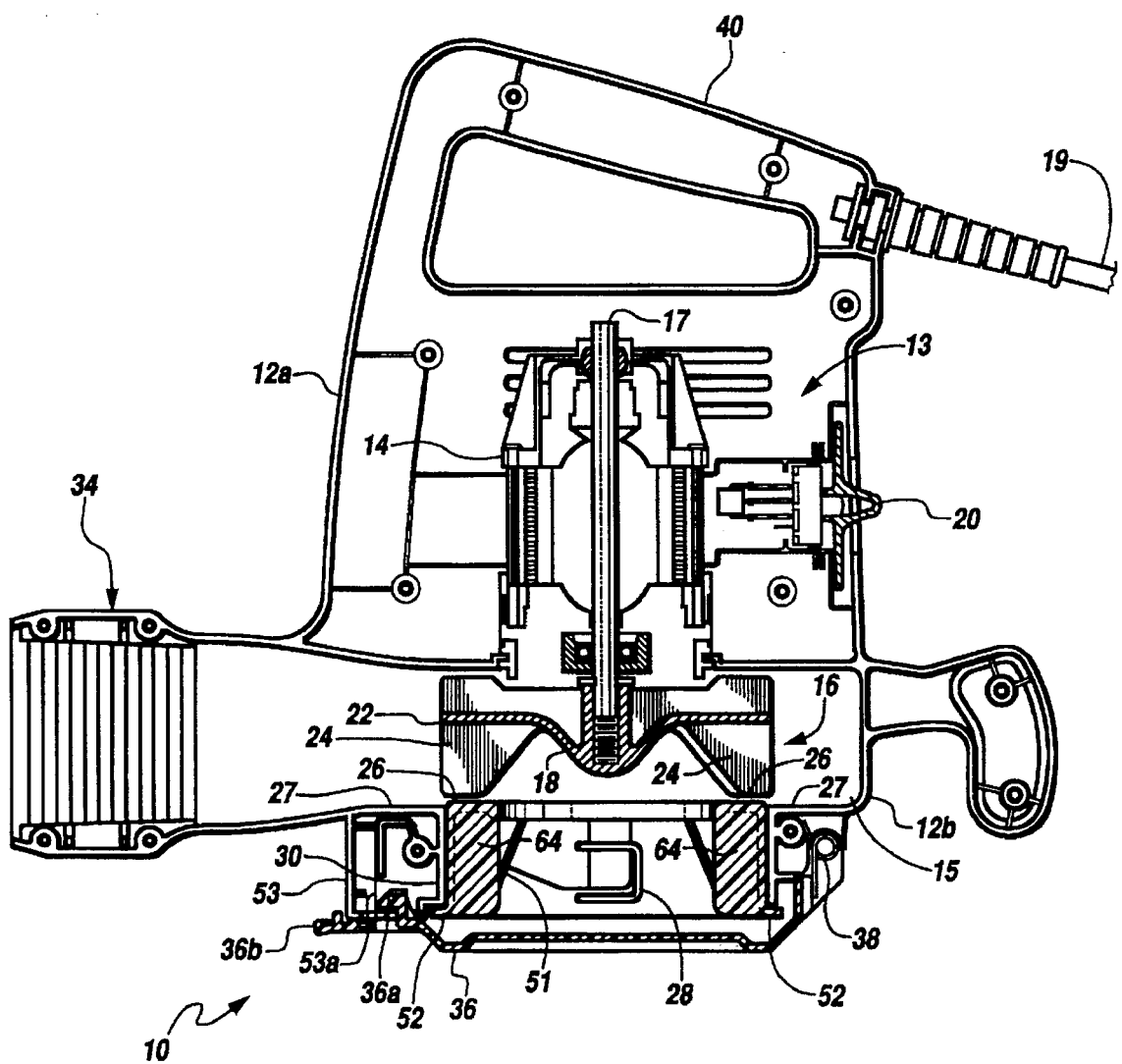
FIG. 2 is the same view as FIG. 1, with a baffle insert is installed in an air inlet of the fan housing.
Figure 7:
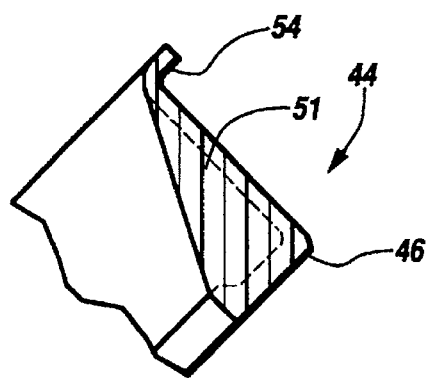
FIG. 7 is a cross-section of the baffle insert taken along section line 7—7 in FIG. 5.
Figure 8:
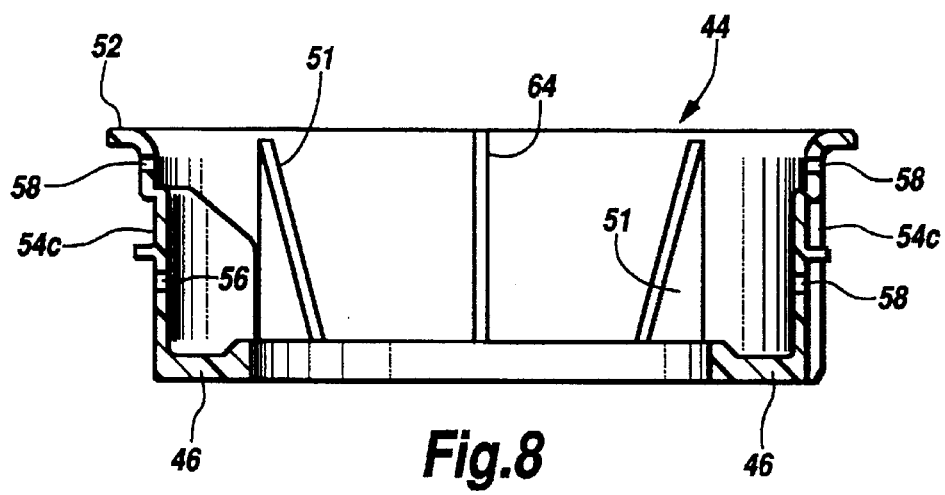
FIG. 8 is a cross-section of the baffle insert taken along section line 8—8 in FIG. 5.
Figure 9:
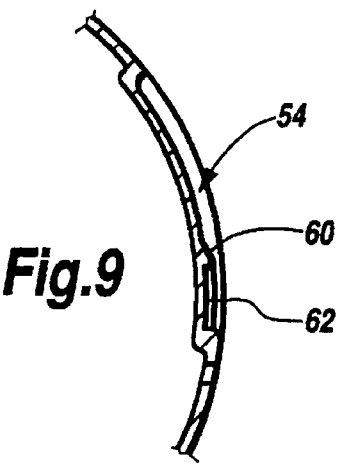
FIG. 9 is a cross-section of the baffle insert taken along section line 9—9 in FIG. 4.

As shown in FIG. 2, once the insert has been installed, the baffle is disposed closely adjacent tips 26 of vanes 24 and fits snugly within and against the collar 30. The profile of the Ribs 51 strengthen the baffle member for ensuring that the baffle remains closely positioned to the tips of the vanes. The close proximity of the baffle and its narrowing of the opening help to prevent significant amounts of air from flowing directly between the fan chamber 15 and the air inlet opening 29, causing a loss of fan pressure. Reducing this direct flow of air helps to create a greater pressure differential between the air inlet and the outlet of the fan, resulting in greater air velocity at the outlet. Flange 52 of the insert rests closely against the outside edge of the collar and assists in preventing a flow of air and dirt from entering the space between the insert and the collar. A buildup of dirt between the insert and the collar could cause the two pieces to jam together when trying to twist the insert to unlock and remove it.

Once the insert is installed, cover 36 is closed. A ring-shaped, upward facing opening is thereby defined around the collar, between the outside edge of the collar and an upturned peripheral edge or lip of the cover 36. The diameter of the edge of the lip is greater than the diameter of collar 30. Air entering the inlet opening 29 first flows downwardly as it enters the ring-shaped opening. Then it turns abrupt by upwardly into the inlet opening 29. The cover includes a resilient locking hook 36a for latching the cover to the fan housing. A slot mating latch structure 53 is disposed on the bottom side of the fan housing 12b and includes a spring loaded hook member 53a for latching with the hook 36a. A release tab 36b provides leverage to pull the cover away from the opening once hooking hook 36a is locking hook 36a is unlatched. To complete the conversion of the fan to a leaf blower, a concentrator tube (not shown) is inserted into outlet collar 34.

Referring now to FIGS. 3–9, the insert 44 includes two, diametrically opposed channels 54 for engaging lugs 50 (FIG. 1). As shown most clearing in FIG. 4, each of the two channels (only one is shown) includes an axially aligned section 54a, which allows the insert to move in the direction of the axis of the impeller, a diagonal section 54b which causes the insert to twist as it is moving axially, and a locking section 54c which is perpendicular to the axis of the impeller. On the end of the locking section is located on a flexible locking tab portion 56 of the side wall 48. The tab portion 56 is made flexible by a "U" shaped slot 58, defined through the side wall 48, surrounding the end of the locking section 54c of the channel. Hump 60 extends across the bottom of the locking section of the channel and defines between it and the end of the channel a locking depression or cavity 62. As the insert is being twisted during installation, lug 50 (FIG. 1) presses against the hump. Applying pressure to the hump tends to force the tab to bend. Once sufficient pressure is applied, the hump is moved far enough down to permit the lug to pass into the locking cavity 62. The tab portion then springs back, thereby automatically capturing the lug within the locking depression and locking the insert 44 to collar 30 (FIG. 1). Twisting the insert in the opposite direction presses down the hump and releases the lug from the locking cavity 62, thus unlocking the insert. No fasteners are manipulated to lock and unlock the insert. Shown most clearly in FIG. 6 are large, ear-like tabs 64 depending from the inside surface of the side wall 48 which provide surfaces for manually applying a twisting force to the insert and for grasping the insert for removal.

Figure 10:
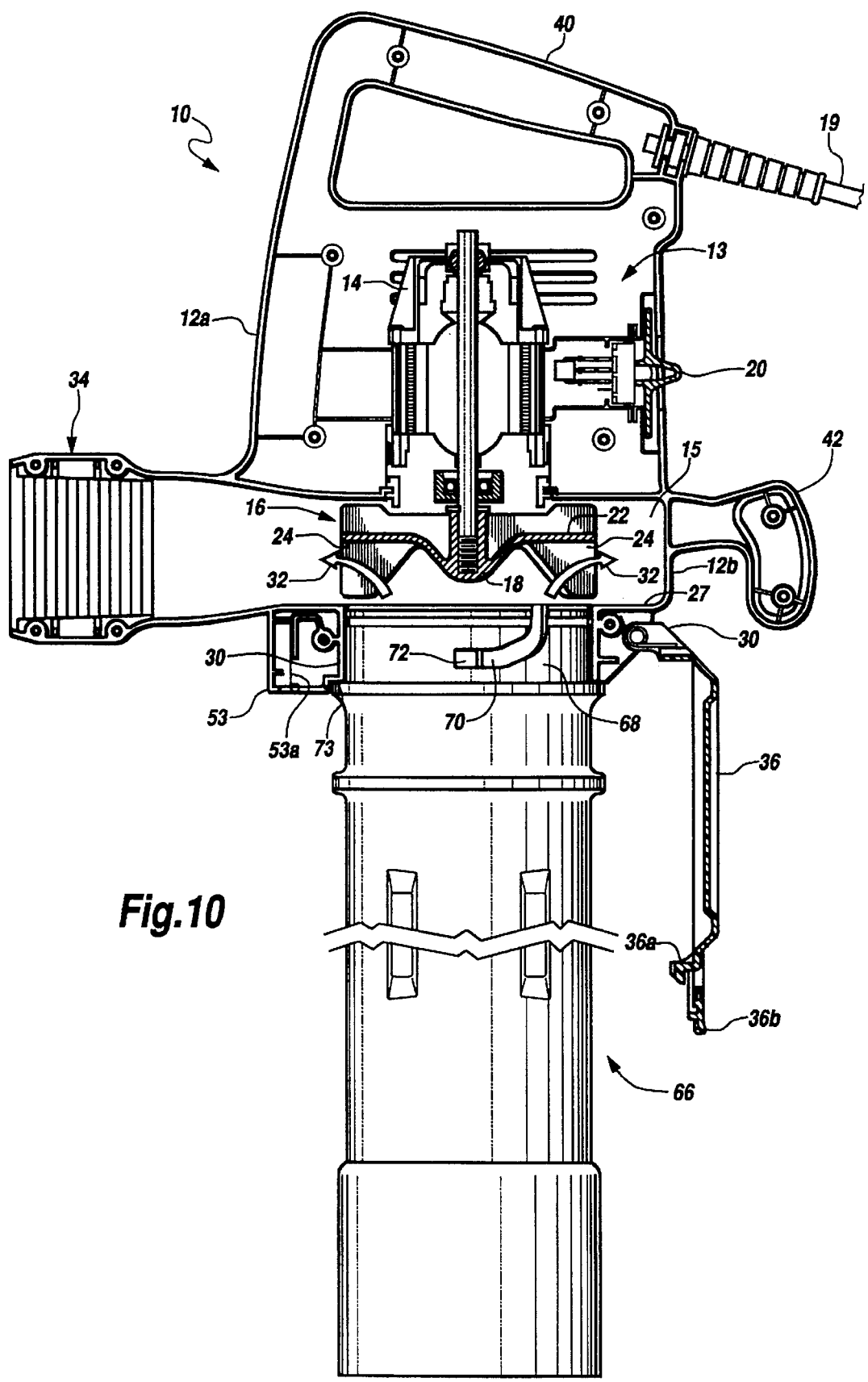
FIG. 10 is a side view of the blower/vacuum unit of FIG. 1 with the baffle insert removed and a vacuum tube installed.

Referring now to FIG. 10, to convert the blower/vacuum unit 10 to a vacuum mode, the insert 44 (FIG. 2) is removed to provide a larger diameter air inlet opening. A larger diameter air inlet enables a larger volume of air to enter the fan housing. A greater volume of air allows increases the capacity of the blower/vacuum unit 10 for vacuuming. A vacuum tube 66 is inserted into the air inlet opening 29 (FIG. 1) in a manner similar to that of the baffle insert 44. The vacuum tube includes a neck portion 68 which fits closely within collar 30 and helps to make the connection more rigid to prevent significant swaying of the tube with respect to the opening. Flange 73 circumscribes the tube and provides additional rigidity and seals the space between the neck 68 and the collar 30. The vacuum tube as connected to the collar in the same manner as insert 44. Defined in opposite sides of the neck portion of the vacuum tube are two channels 70 (only one can be seen). The channels 70 have dimensions similar to those of channels 54 of insert 44 (FIG. 4). The vacuum tube channels follow lugs 50 (FIG. 1) as the tube is being inserted and twisted into the air inlet opening.

The forgoing description is of a preferred embodiment of the invention. It is intended to illustrate the invention, not to limit the invention to a specific embodiment. The disclosed embodiment is capable of being modified or altered without departing from the scope of the invention as set forth in the appended claims.

What is claimed is:

1. A portable leaf blower-vacuum apparatus operable in a blower mode and in a vacuum mode comprising:

a motor having a drive shaft;

a centrifugal fan including a housing in which is disposed an impeller coupled to the drive shaft of the motor for rotation about an axis of rotation, the housing including a substantially cylindrical collar portion having inside surfaces defining an air inlet opening, the housing further defining an air outlet opening;

a cover for cooperating with the air inlet opening when in the blower mode to prevent ingestion of objects into the impeller while allowing a flow of air into the impeller;

a handle for manually carrying the motor and fan in an elevated position;

a sleeve-shaped insert for placing within the air inlet opening during the blower mode, the insert supporting means for narrowing the diameter of the air inlet opening proximate to the impeller; and a connector having cooperating first and second connector members for manually connecting the insert to the collar when the insert is placed within the collar for use in the blower mode and manually releasing the insert for removal for conversion to the vacuum mode, the first connector member attached to an exterior surface of the insert and the second connector member attached to the inside surfaces of the collar defining the air inlet opening.

2. The apparatus of claim 1 further comprising a vacuum tube having an end portion for insertion into the air inlet opening, the end portion including a third connector member for cooperating with the second connector member on the collar for releasably securing the vacuum tube to the collar in the vacuum mode.

3. The apparatus of claim 1 wherein the means for narrowing includes a ring-shaped baffle formed on one end of the insert and extending into the air inlet opening, adjacent to the impeller, for increasing pressure across the impeller.

4. The apparatus of claim 1 wherein one of the first and second connector members includes a key and the other of the first and second connector members includes a key way having a channel for retaining movement of the insert along the axis of rotation of the impeller.

5. The apparatus of claim 4 wherein the collar and the insert have a substantially cylindrical shape and wherein the key way includes a channel portion oriented for simultaneously rotating and translating the insert as the key follows the key way when the insert is manually moved into or out of the air inlet opening along the direction of the axis of rotation of the impeller.

6. The apparatus of claim 5 wherein the insert includes first and second opposed tabs extending radially inwardly from inside surfaces of the insert for assisting with manually moving the insert into and out of the air inlet opening.

7. The apparatus of claim 1 wherein the insert is substantially entirely received within the collar and wherein the cover to the air inlet opening includes an outer edge for defining with the fan housing an air flow path therebetween when the cover is cooperating with the air inlet opening in the blower mode to prevent ingestion of objects into the impeller while allowing the flow of air into the impeller.

8. The apparatus of claim 1 wherein the cover is attached on one side to the housing by a hinge for permitting the cover to swing between a closed position in which the cover cooperates with the air inlet opening to prevent ingestion of objects into the impeller while allowing a flow of air into the impeller, and an open position away from the air inlet opening.

9. The apparatus of claim 1 further including means for connecting the cover to an exterior surface of the housing in the blower mode in order for the cover to cooperate with the air inlet opening to prevent ingestion of objects by the impeller while allowing the flow of air to the impeller, and for disconnecting the cover from the exterior surface of the housing for conversion to the vacuum mode without also disconnecting the insert from the collar.

10. A portable leaf blower-vacuum apparatus operable in a blower mode and in a vacuum mode comprising:

a motor having a drive shaft;

a centrifugal fan including a housing in which is disposed an impeller coupled to the drive shaft of the motor for rotation about an axis, the housing including a substantially cylindrical collar having inside surfaces defining an air inlet opening;

a cover for cooperating with the air inlet opening in the blower mode to prevent ingestion of objects while allowing air to enter the air inlet opening;

a handle for manually carrying the motor and housing in an elevated position;

an insert for placing within the air inlet opening, the insert when placed within the air inlet opening being aligned with the collar of the air inlet opening, the insert supporting means for narrowing the opening area of the air inlet opening in an area proximate to the impeller; and a connector having cooperating first and second connector members for manually connecting the insert to the inside surfaces of the collar in the blower mode and for manually releasing the insert from the collar for removal during conversion to the vacuum mode, the first member of the connector attached to an exterior surface of the insert and the second member of the connector attached to the inside surface of the collar defining the air inlet opening; one of the first and second connector members including a key and the other of the first and second connector members including a key way for engaging the key.

11. The apparatus of claim 10 wherein the means for narrowing includes an annular baffle depending from one end of the insert adjacent to the impeller for increasing pressure across the impeller.

12. The apparatus of claim 10 wherein the insert includes first and second opposed tabs extending radially inwardly from inside surfaces of the insert for assisting in manually moving the insert into and out of the air inlet opening.

13. The apparatus of claim 10 wherein the cover is connected to the housing by a hinge for permitting the cover to swing between a closed position in which the cover covers the air inlet opening for preventing ingestion of objects by the impeller while allowing the flow of air into the impeller, and an open position away from the air inlet opening.

14. The apparatus of claim 10 further comprising a vacuum tube having an end portion for insertion into the air inlet opening, the end portion including a third connector member for cooperating with the second connector member on the collar to releasably securing the vacuum tube to the collar in the vacuum mode.

15. The apparatus of claim 10 further including means for connecting the cover to an exterior surface of the housing in the blower mode in order for the cover to cooperate with the air inlet opening to prevent ingestion of objects by the impeller while allowing the flow of air to the impeller, and for disconnecting the cover from the exterior surface of the housing for conversion to the vacuum mode without also disconnecting the insert from the collar.

16. A portable leaf blower-vacuum apparatus operable in a blower mode and in a vacuum mode comprising:

a motor having a drive shaft;

a centrifugal fan including a housing in which is received an impeller coupled to the drive shaft of the motor for rotation about an axis of rotation; the housing defining an air outlet opening and including a substantially cylindrical collar defining a circular air inlet opening;

a cover for cooperating with the air inlet opening when in the blower mode to prevent ingestion of debris and allow a flow of air into the impeller;

a handle for manually carrying the motor and housing in an elevated position;

a sleeve shaped insert for placing within the air inlet opening defined by the collar, the insert supporting a ring shaped baffle adjacent to the impeller for narrowing the diameter of the air inlet opening proximate to the impeller;

a first connector having cooperating first and second connector members for manually connecting the insert to the collar in the blower mode and manually releasing the insert for removal during a conversion to the vacuum mode, the first connector member attached to an exterior surface of the insert and the second connector member attached to the inside surface of the collar defining the air inlet; one of the first and second connector members including a key and the other of the first and second connector members including a key way for engaging the key; and a vacuum tube having an end portion for insertion into the air inlet opening, the end portion including a third connector member for cooperating with the second connector member on the collar for releasably securing the vacuum tube to the collar in the vacuum mode.

17. The apparatus of claim 16 wherein the key way includes a channel portion oriented for simultaneously rotating and translating the insert as the key engages the keyway and the insert is manually moved into or out of the collar along the direction of the axis of rotation of the impeller, and wherein the insert includes first and second opposed tabs extending radially inwardly from inside surfaces of the insert for assistance with manually twisting the insert.

18. The apparatus of claim 16 wherein the cover is connected to the housing by a hinge for overlaying the air inlet opening in a closed position and for swinging away from the air inlet opening in an open position, and wherein the cover to the air inlet opening includes an outer edge for defining with the fan housing an air path therebetween when the cover overlays in a closed position.

19. The apparatus of claim 16 further including means for connecting the cover to an exterior surface of the housing in the blower mode in order for the cover to cooperate with the air inlet opening to prevent ingestion of objects by the impeller while allowing the flow of air to the impeller, and for disconnecting the cover from the exterior surface of the housing for conversion to the vacuum mode without also disconnecting the insert from the collar.

* * * * *